United States Patent
Kim (10) Patent No.: US 9,742,236 B2
(45) Date of Patent: Aug. 22, 2017

(54) TERMINAL FOR VEHICLE TRACTION MOTOR AND METHOD OF MANUFACTURING THE SAME

(71) Applicant: HYUNDAI MOBIS CO., LTD., Seoul (KR)

(72) Inventor: Do-Hyun Kim, Anyang-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 419 days.

(21) Appl. No.: 14/445,683

(22) Filed: Jul. 29, 2014

(65) Prior Publication Data
US 2016/0036278 A1 Feb. 4, 2016

(51) Int. Cl.
*H02K 11/00* (2016.01)
*H02K 3/52* (2006.01)

(52) U.S. Cl.
CPC ......... *H02K 3/522* (2013.01); *H02K 2203/09* (2013.01)

(58) Field of Classification Search
CPC .................. H02K 3/522; H02K 2203/09
USPC ....................... 29/596; 310/71, 43
See application file for complete search history.

(56) References Cited

U.S. PATENT DOCUMENTS

| 6,369,473 | B1 * | 4/2002 | Baumeister | H02K 3/522 310/71 |
| 7,193,345 | B2 * | 3/2007 | Shinzaki | H02K 3/522 310/179 |
| 8,922,080 | B2 * | 12/2014 | Nakagawa | H02K 3/522 310/71 |
| 2011/0215662 | A1 * | 9/2011 | Lee | H02K 3/38 310/71 |
| 2012/0126646 | A1 * | 5/2012 | Nakagawa | H02K 3/522 310/71 |
| 2012/0235524 | A1 * | 9/2012 | Sasaki | H02K 3/522 310/71 |
| 2013/0328425 | A1 * | 12/2013 | Tomita | H02K 11/0094 310/71 |

FOREIGN PATENT DOCUMENTS

KR 10-2011-0101333 A 9/2011

* cited by examiner

*Primary Examiner* — Hanh Nguyen
(74) *Attorney, Agent, or Firm* — NSIP Law (57) ABSTRACT

A terminal of a vehicle traction motor includes a plurality of bus bars placed on an assembly jig, a plurality of insulation spacers, where an insulation spacer is inserted between the a pair of bus bars, and a terminal mold placed over the plurality of bus bars and the plurality of insulation spacers, the terminal mold being coupled to an outermost bus bar of the plurality of bus bars, wherein a diameters of each of the plurality of bus bars is different from the other bus bars, and a diameters of each of the insulation spacers is different from the other insulation spacers.

14 Claims, 13 Drawing Sheets

TERMINAL FOR VEHICLE TRACTION MOTOR AND METHOD OF MANUFACTURING THE SAME

BACKGROUND

1. Field

The following description relates to a terminal unit of a traction motor, and to a power distribution module for a traction motor used in a terminal, which is a power supply portion of a traction motor.

2. Description of Related Art

Figure 1:
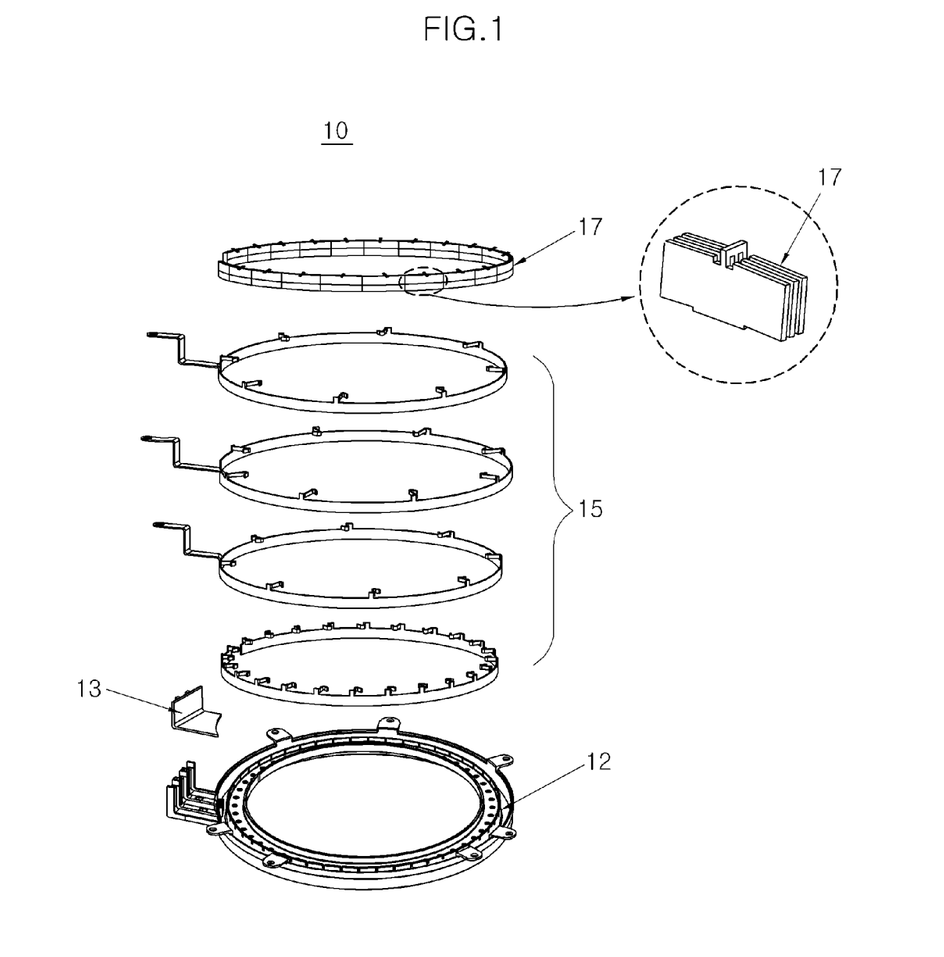
FIG. 1 is an example of a diagram illustrating a conventional terminal unit of a vehicle traction motor.

A terminal unit of a traction motor is a module that supplies a traction motor with a voltage input from the outside. Referring to FIG. 1, a conventional terminal unit of a traction motor 10 includes a terminal mold 12, a mold cover 13, a plurality of bus bars 15, and spacers 17 for insulating the plurality of bus bars 15, which are fixed and insulated by silicon. As shown in FIG. 1, the mold cover 13 is coupled to a part that extends from the terminal mold 12.

Conventional terminal unit of a traction motor 10 has a structure where the non-insulated bus bars 15 are press-fitted to the terminal mold 12 using the spacers 17. After being assembled to the terminal mold 12 to secure the distances between the bus bars 15, and insulation is maintained by filling the spaces where the spacers 17 are not present with silicon. The spacers 17 are divided into plural numbers, and each of the spacers 17 is formed in the form of a partition wall as shown in an enlarged view of FIG. 1.

In a process of press-fitting the spacers 17 that have the form of the partition wall in the conventional terminal unit of a traction motor 10, a possibility of generating plating foreign substances on the bus bars 15 may increase, thereby increasing the likelihood of deterioration of the insulation and durability of the terminal unit.

In addition, burrs of the bus bars 15 generated during manufacturing and burrs generated during annular forming of the bus bars 15 may fall between the bus bars 15 in the press-fitting process of the spacers 17, thereby increasing the likelihood of deterioration of the insulation and durability of the terminal unit.

Figure 2:
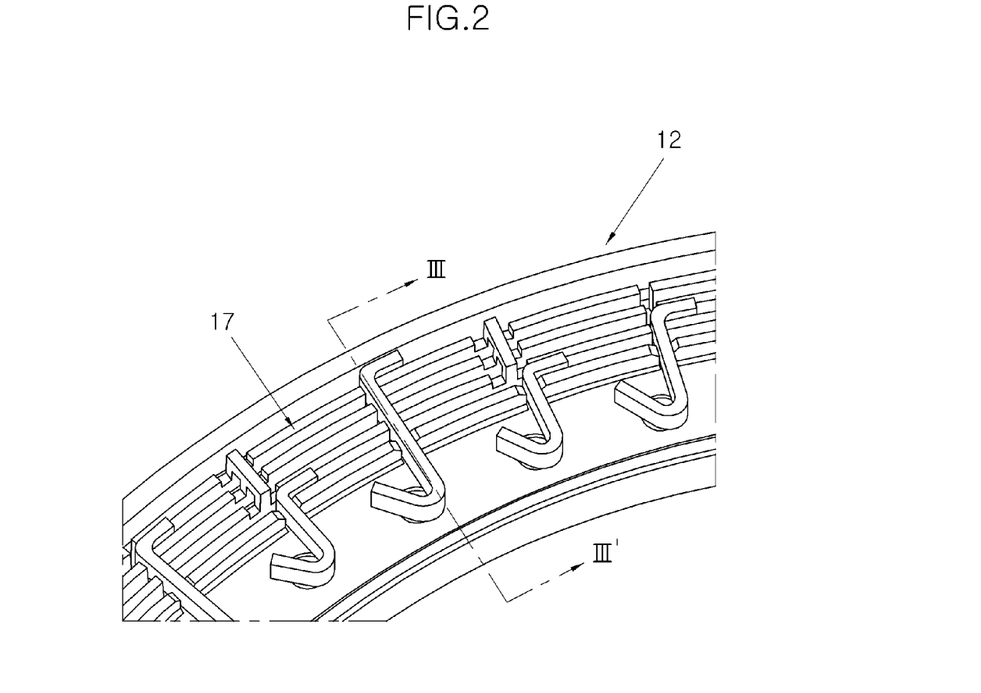
FIG. 2 is an example of a diagram illustrating a partial perspective view of a structure in which spacers and bus bars are assembled to a conventional terminal mold.
Figure 3:
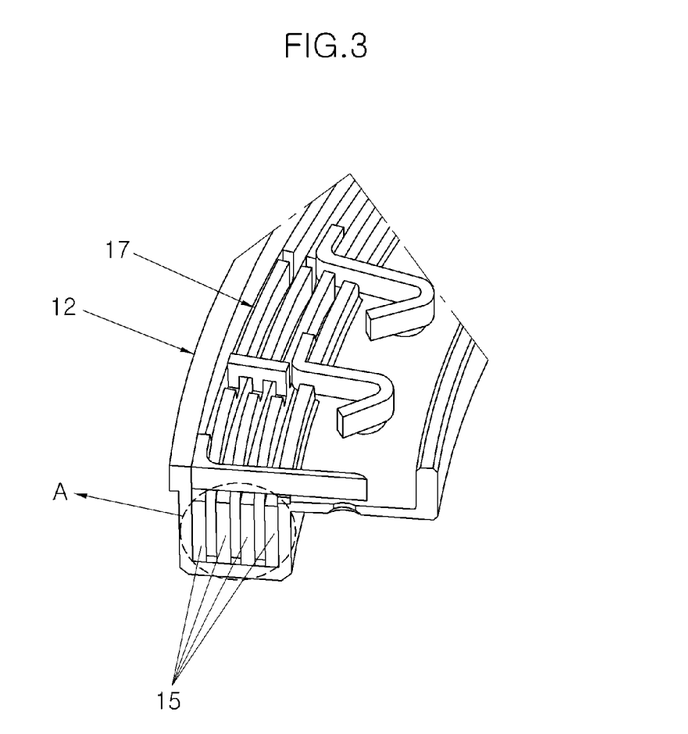
FIG. 3 is a diagram illustrating an example of a cross-sectional taken along line III-III' of FIG. 2.

FIG. 2 is an example of a diagram illustrating a partial perspective view of the terminal mold 12 in the conventional terminal unit of a traction motor 10. FIG. 3 is a drawing illustrating a cross-sectional taken along line III-III' of FIG. 2.

Referring to FIGS. 2 and 3, the terminal unit of a traction motor 10 has a problem of deteriorating insulation and durability since empty spaces are present between the plural spacers 15 after press-fitting, as shown in portion "A" of FIG. 3.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a terminal of a vehicle traction motor, including a plurality of bus bars placed on an assembly jig, a plurality of insulation spacers, where an insulation spacer is inserted between the a pair of bus bars, and a terminal mold placed over the plurality of bus bars and the plurality of insulation spacers, the terminal mold being coupled to an outermost bus bar of the plurality of bus bars, wherein a diameters of each of the plurality of bus bars is different from the other bus bars, and a diameters of each of the insulation spacers is different from the other insulation spacers.

The plurality of bus bars and the plurality of insulation spacers may be alternately and sequentially assembled on the assembly jig.

Each insulation spacer of the plurality of insulation spacers may have a four-divided structure to allow diameters of the insulation spacer to be adjustable.

Positions of the plurality of bus bars and the plurality of insulation spacers may be fixed using an overmold.

Positions of the plurality of bus bars and the plurality of insulation spacers may be fixed using resin.

The plurality of bus bars and the plurality of insulation spacers may be assembled in a reversed order.

The terminal mold may be assembled in a direction from up to down.

Each of the plurality of bus bars and each of the plurality of insulation spacers may have an annular shape.

The plurality of bus bars and the plurality of insulation spacers may form a subassembly assembled before being placed in the terminal mold.

The subassembly may be fixed by an overmold.

The subassembly may be fixed by silicon.

In another general aspect, there is provided a method of manufacturing a terminal of a vehicle traction motor, the method including preparing an assembly jig, arranging a plurality of insulation spacers and a plurality of bus bars on the assembly jig such that an insulation spacer is inserted between a pair of bus bars, the plurality of insulation spacers having different diameters from each other and the plurality of bus bars having different diameters from each other, disposing a terminal mold over the plurality of bus bars and the plurality of insulation spacers, and coupling the terminal mold to an outermost bus bar of the plurality of bus bars.

The plurality of bus bars and the plurality of insulation spacers may be alternately and sequentially assembled on the assembly jig.

Positions of the plurality of bus bars and the plurality of insulation spacers may be fixed using an overmold.

The method may include fixing positions of the plurality of bus bars and the plurality of spacers using an overmold.

The method may include fixing positions of the plurality of bus bars and the plurality of spacers using resin.

The plurality of bus bars and the plurality of spacers may be assembled in a reversed order.

The terminal mold may be assembled in a direction from up to down.

Each of the plurality of bus bars and each of the plurality of insulation spacers may have an annular shape.

The plurality of bus bars and the plurality of insulation spacers may form a subassembly.

Each of the plurality of bus bars may correspond to a phase of connected power.

Other features and aspects will be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses, and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

FIGS. 4A to 4E are diagrams illustrating examples of a method of manufacturing a terminal unit of a vehicle traction motor. FIG. 4F is a diagram illustrating an example of the terminal unit of a vehicle traction motor produced by such a manufacturing method.

A method of manufacturing a terminal unit of a vehicle traction motor 100 will be described with reference to FIGS. 4A to 4E. The operations in FIGS. 4A to 4E may be performed in the sequence and manner as shown, although the order of some operations may be changed or some of the operations omitted without departing from the spirit and scope of the illustrative examples described. Many of the operations shown in FIGS. 4A to 4E may be performed in parallel or concurrently.

Figure 4A:
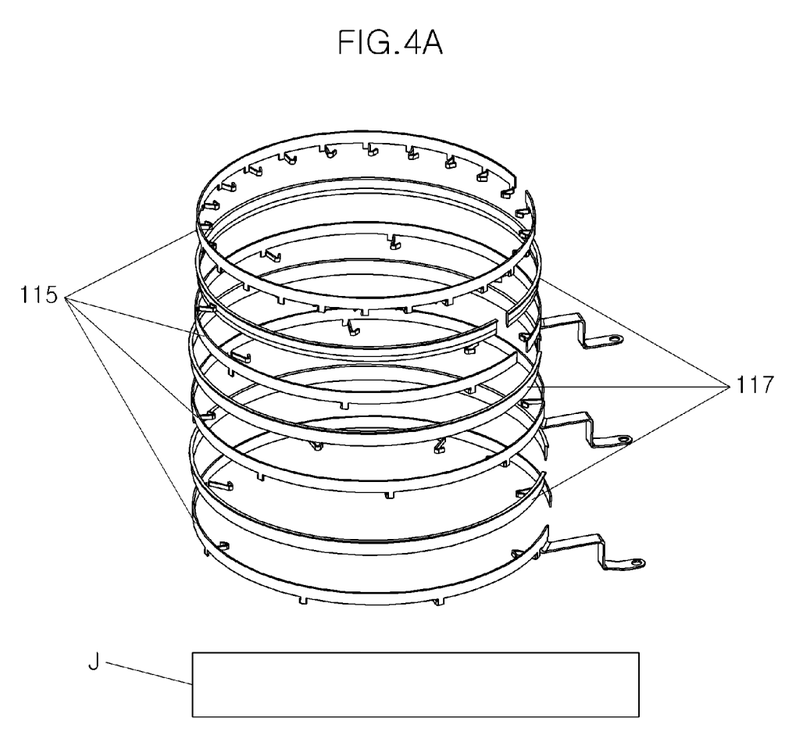
FIGS. 4A to 4F are diagrams illustrating examples of a method of manufacturing a terminal unit of a vehicle traction motor.

As shown in FIG. 4A, the method includes preparing an assembly jig J for assisting assembly of the terminal unit of a vehicle traction motor 100, and preparing bus bars 115 and spacers 117.

Figure 7:
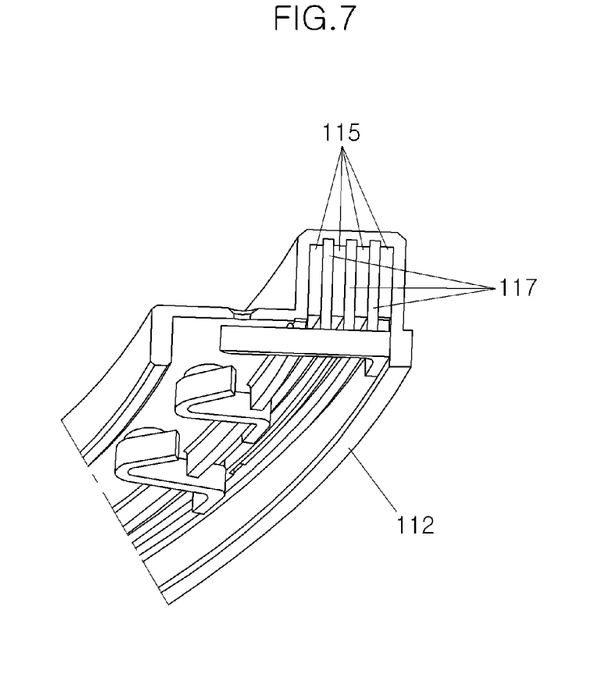
FIG. 7 is a diagram illustrating an example of a cross-sectional taken along line VII-VII' of FIG. 6.

The bus bars 115 are provided corresponding to phases U, V, W, and N of power connected thereto. As shown in FIG. 7, the bus bars 115 may be alternately and sequentially assembled in a terminal mold 112 by overlapping each other while interposing the annular spacers 117 having different diameters.

Each of the spacers 117 has a reversed annular shape and is inserted between the bus bars 115 to serve as an insulation between the bus bars 115. The spacers 117 have varying diameters so that they can be inserted between the bus bars 115.

Figure 5:
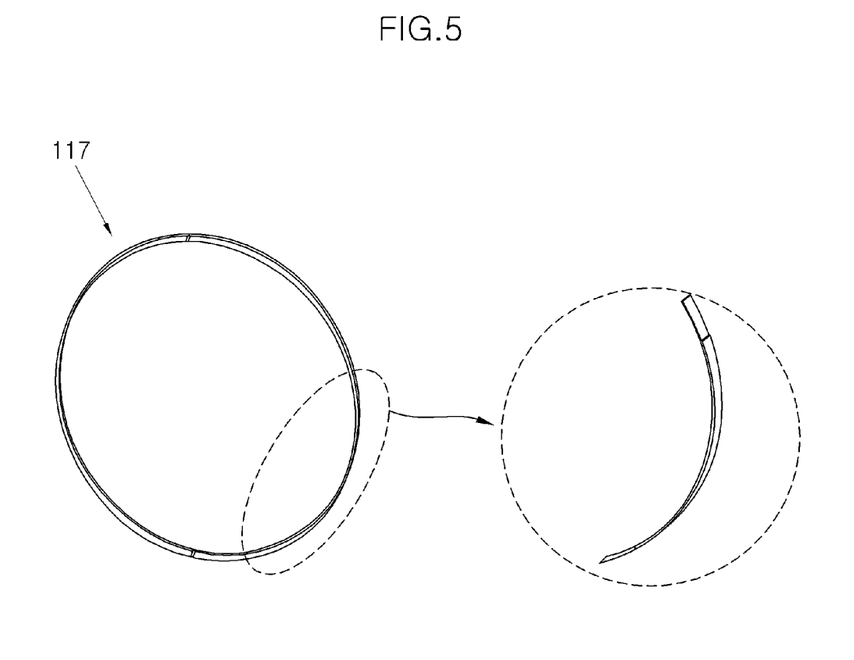
FIG. 5 is a diagrams illustrating an example of a spacer.

As shown in FIG. 5, each of the spacers 117 has a four-divided structure, which allows its diameter to be adjustable during assembly. Accordingly, the spacers 117 may be manufactured at low costs since spacers having different diameters need not be separately manufactured to correspond to diameters of the bus bars 115 connected to the respective phases U, V, W, and N.

Since each spacer 117 has a four-divided structure, the diameters of the spacers 117 are adjustable during the assembly. Therefore, the spacers 117 may be manufactured using only one mold, compared to requiring three molds to manufacture the spacers 117 for the respective phases in the related art.

Figure 4B:
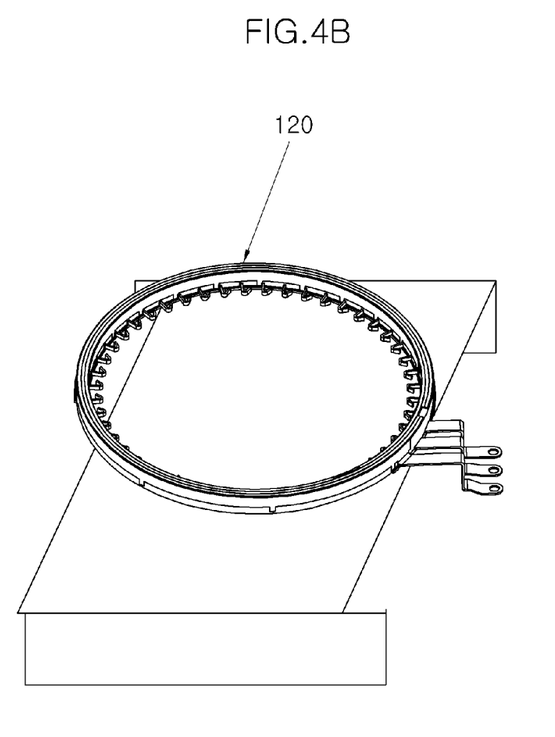

As shown in FIG. 4B, the bus bars 115 and the spacers 117 are sequentially overlapped and assembled using the prepared assembly jig J as a support base, so that a subassembly 120 is completed.

Unlike the related art, in the terminal unit of a vehicle traction motor 100 empty spaces are not present between the spacers 117, because the bus bars 115 and the spacers 117 are sequentially assembled. The empty spaces may cause reduce durability due to an injection-molded product not being adequately filled during overmolding.

Unlike the related art, in assembling the bus bars 115 and the spacers 117 using the assembly jig J as a support base, the spacers 117 are inserted between the bus bars 115 in a reversed state instead of being performed inside the terminal mold 112. Therefore, it may be possible to prevent deterioration of durability caused due to foreign substances being left inside the terminal mold 112 during the conventional assembly process.

Figure 4C:
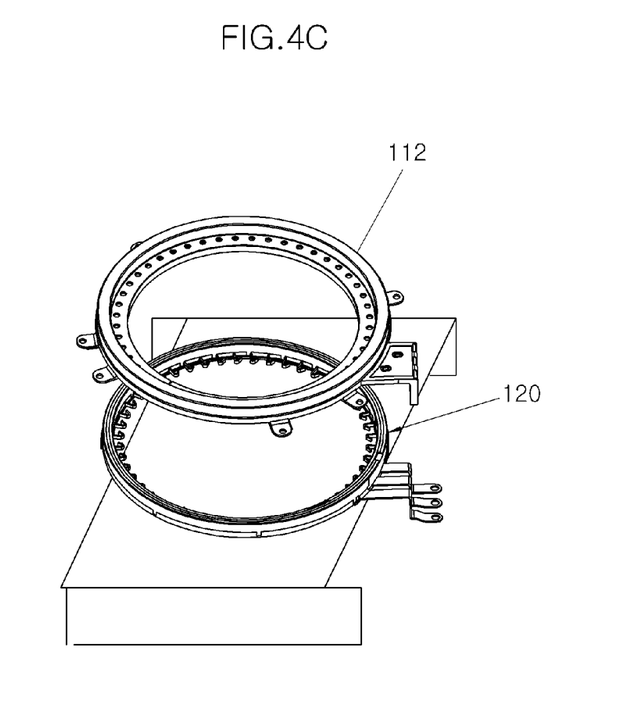
Figure 6:
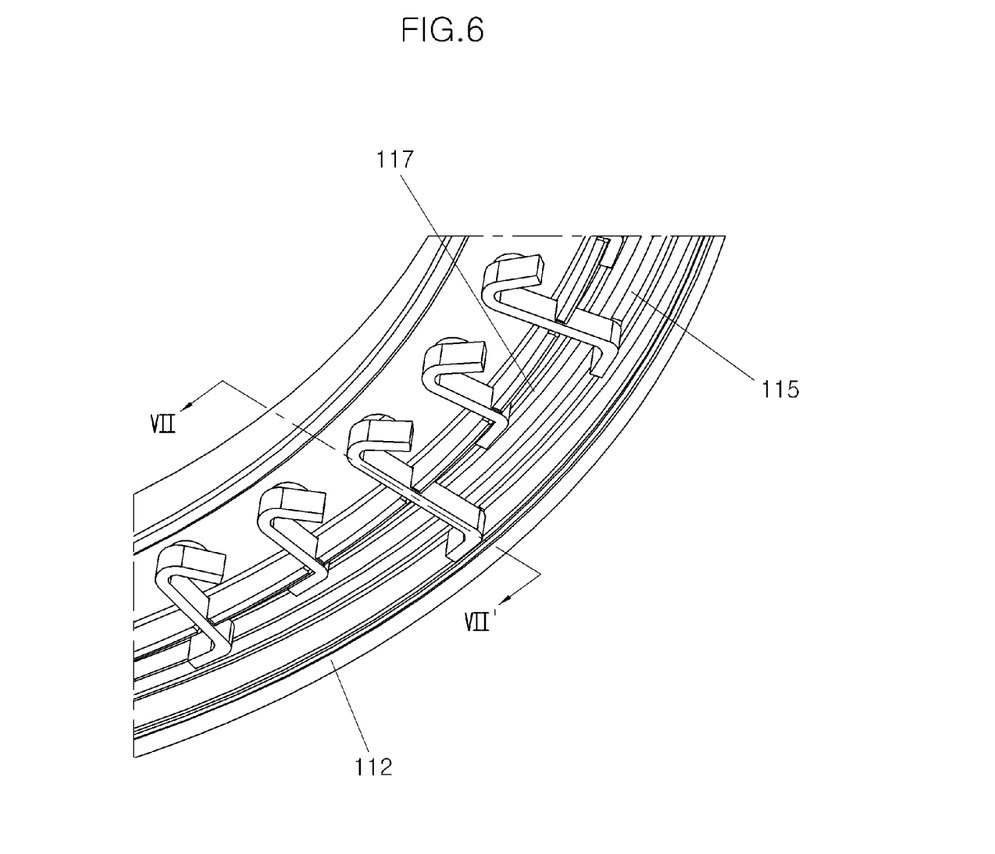
FIG. 6 is a diagram illustrating an example of an enlarged view of portion "A" of FIG. 4D.

Referring to FIG. 4C, the subassembly 120 assembled with the bus bars 115 and the spacers 117 is supported by the assembly jig J. The terminal mold 112 is assembled in a direction from up to down such that the subassembly 120 is inserted into an inner space of the terminal mold 112, as shown in FIGS. 6 and 7.

Figure 4D:
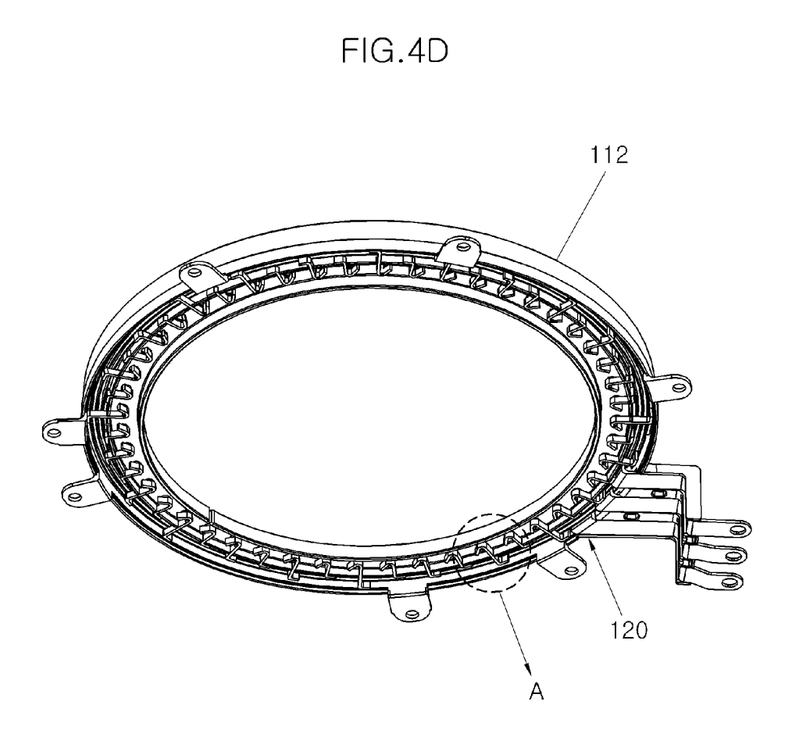

An assembly formed by such an process is shown in FIG. 4D. FIG. 4D shows that the terminal mold 112 assembled with the subassembly 120 is rotated such that an opening portion thereof is directed forward.

Unlike the conventional assembly method in which the spacers and the bus bars are assembled in the direction from up to down to the inner space of the terminal mold located below, the assembly is performed such that the inner space of the terminal mold 112 is covered by the subassembly 120. Therefore, it may be possible to minimize deterioration of durability caused due to foreign substances left in the inner space of the terminal mold 112.

Figure 4E:
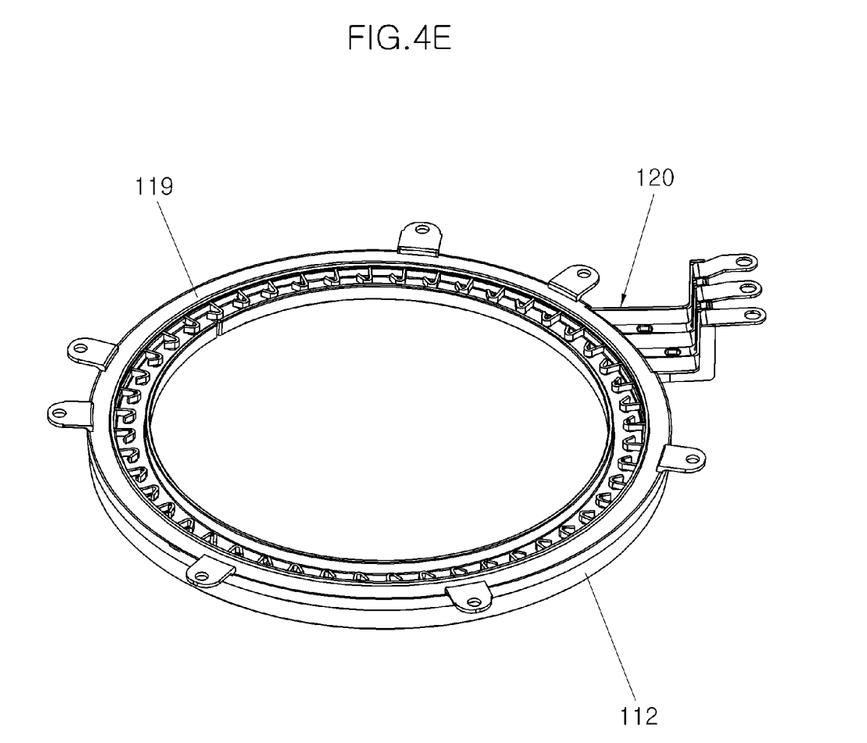
Figure 4F:
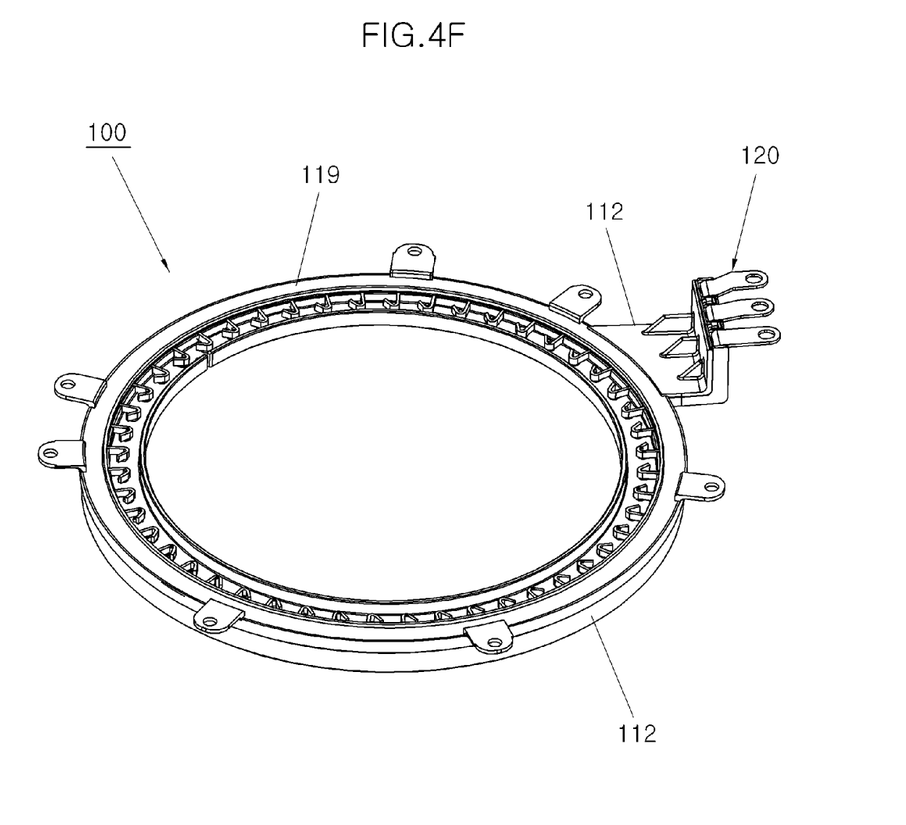
Figure 8:
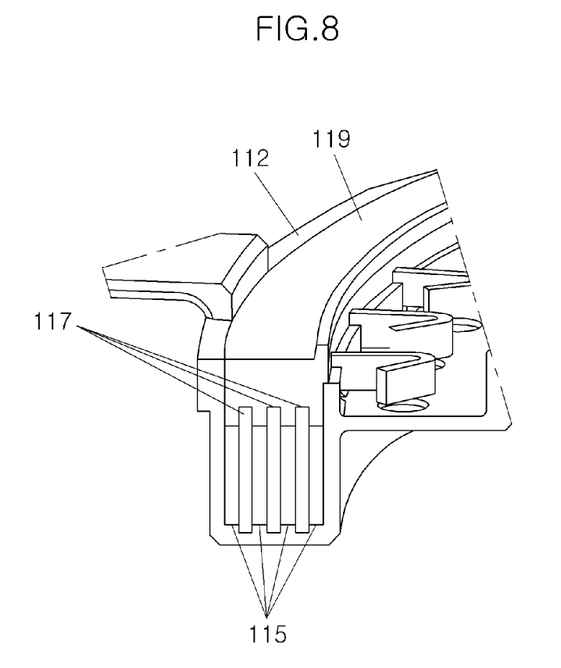
FIG. 8 is a diagram illustrating an example of the terminal unit of a vehicle traction motor.

Referring to FIG. 4E, the terminal mold 112 receiving the subassembly 120 may be fixed by an overmold 119 or resin, as shown in FIG. 8.

As shown in FIG. 4F, a mold cover 113 may be assembled on the terminal mold 112. FIG. 4F shows that the terminal mold 112 is located downward such that the opening of the terminal mold 112 is directed upward, and shows the completed terminal unit of a vehicle traction motor 100 by the assembly process according to the embodiment.

The method of manufacturing the terminal unit of a vehicle traction motor 100 may enhance durability and insulation by performing the assembly process of the bus bars and the spacers performed inside the conventional terminal mold by the separate assembly jig J provided outside the terminal mold so as to reduce a possibility of generating plating foreign substances on the bus bars including burrs of the bus bars 115.

As is apparent from the above description, the present disclosure may enhance durability and insulation by performing an assembly process of bus bars and spacers performed inside a conventional terminal mold by a separate assembly jig provided outside a terminal mold so as to reduce a possibility of generating plating foreign substances on bus bars including burrs of the bus bars.

In addition, the present disclosure may enhance reliability of vibration resistance and shock resistance by introduction of an insulation method using annular spacers having different diameters and a fixing structure using an overmold to reduce empty spaces between the spacers.

In addition, the present disclosure may reduce manufacturing costs since the four-divided spacer allows a diameter thereof to be adjustable and a spacer for each diameter need not be manufactured.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A terminal for a vehicle traction motor, the terminal comprising:
   bus bars;
   an overmold contacting the bus bars;
   each insulation spacer among insulation spacers disposed between adjacent bus bars among the bus bars; and
   a terminal mold placed over the bus bars and the insulation spacers, the terminal mold being coupled to an outermost bus bar of the bus bars,
   wherein a diameter of each bus bar among the bus bars is different from diameters of other bus bars among the bus bars, and a diameter of each insulation spacer among the insulation spacers is different from diameters of other insulations spacers among the insulation spacers,
   wherein each of the insulation spacers comprises a first surface, a second surface, a third surface, and a fourth surface, and
   wherein the first surface is in contact with one of the bus bars, the second surface is in contact with another of the bus bars, the third surface is embedded in a groove of the terminal mold, and the fourth surface is embedded in a groove of the overmold.

2. The terminal of claim 1, wherein the bus bars and the insulation spacers are alternately arranged.

3. The terminal of claim 1, wherein each of the insulation spacers comprises a four-divided structure to allow diameters of the insulation spacer to be adjustable.

4. The terminal of claim 1, wherein the overmold fixes a position of the bus bars and the insulation spacers.

5. The terminal of claim 1, wherein the overmold is made of resin.

6. The terminal of claim 1, wherein each of the bus bars is disposed between adjacent pairs of the insulation spacers.

7. The terminal of claim 1, wherein each of the bus bars and each of the insulation spacers comprises an annular shape.

8. The terminal of claim 7, wherein the overmold is disposed between a first wall of the terminal mold and a second wall of the terminal mold.

9. The terminal of claim 8, wherein a surface of the overmold opposite to the groove of the overmold is level with a surface of a lip of the terminal mold.

10. The terminal of claim 9, wherein the overmold comprises a lip extending from an inner edge of the surface of the overmold.

11. The terminal of claim 1, wherein the bus bars and the insulation spacers form a subassembly that is disposed in the terminal mold.

12. The terminal of claim 11, wherein the terminal mold houses the subassembly.

13. The terminal of claim 11, wherein the subassembly is fixed by the overmold.

14. The terminal of claim 11, wherein the subassembly is fixed by silicon.

* * * * *